Patented Aug. 29, 1944

2,356,794

UNITED STATES PATENT OFFICE 2,356,794

RESIN EMULSION VEHICLE

Alfred L. Peiker, East Bound Brook, N. J., assignor, by mesne assignments, to American Cyanamid Company, New York, N. Y., a corporation of Maine No Drawing. Application January 21, 1939, Serial No. 252,068

4 Claims. (Cl. 260—15)

This invention relates to printing and coloring of materials, and more particularly to the dyeing and printing of textile fabrics.

The printing of fabrics has usually been effected by using printing pastes in which there is dispersed a soluble or insoluble form of coloring matter which is then transformed on the fiber into the final color or the fabric is first treated with one component capable of forming a color and is then printed with another component which reacts therewith under suitable conditions to produce the color. These processes involve development of the color after printing and are extremely wasteful of color since only a small portion thereof adheres to the fiber and usually they do not give as sharp outlines as might be desired due to creeping or bleeding of the print.

It has been proposed in the past to print materials with lacquers, that is to say, solutions of various cellulose esters with or without resins, either natural or synthetic, in organic solvents, coloring matter being dispersed through the solution or dissolved therein. Lacquer printing avoids some of the disadvantages of the ordinary printing procedures in that sharp prints are possible and there is little or no waste of coloring matter. It is also possible to use pigment colors which cannot be printed in the ordinary manner. While lacquer printing has the above advantages, it has not been used very widely because of several defects, one being that the film which is formed on evaporation of the lacquer solvent is so stiff that it binds fibers of textile fabrics together to produce a final product that is not flexible and has a harsh feel. The surface gloss of the lacquer is also undesirable in many cases as it may differ from the finish desired on the material coated.

All of the disadvantages of both the ordinary printing process and lacquer printing are avoided in the invention of Kienle and Peiker, described and claimed in their application, Serial No. 222,149, filed July 30, 1938, while, however, retaining the sharpness of lacquer prints. According to their invention, an aqueous dispersion, preferably an emulsion, of a water-insoluble resin or resins is used as the printing vehicle and sharp prints with all the clarity and color economy of lacquer prints are obtained while, at the same time, the emulsion does not unduly stiffen the goods.

According to the present invention, improved results over those obtained by the process of the copending application of Kienle and Peiker referred to above may be obtained by incorporating an organic solvent soluble and substantially water insoluble cellulose ether, such as ethyl cellulose, into the water-insoluble resin or resins and using this blend instead of the resin alone to prepare a colored emulsion suitable for the dyeing and printing of fabrics.

Fabrics printed with the compositions of the present invention possess a marked resistance to crocking, either wet or dry, and their washfastness is excellent.

The water-insoluble resins usable in the present invention may be chosen from any of the common types of polymerides such as alkyd resins, phenol-aldehyde resins, water-insoluble aldehyde-urea resins, vinyl ester polymerides, rubber latex, and the like, so long as the cellulose ether added is compatible with the particular resin chosen. While the present invention is not limited to any particular water-insoluble resin or resinous base, I have found that the alkyd resins, and particularly the air oxidizing alkyd resins modified with drying acids or oils, are particularly useful, producing extremely sharp prints without any undue stiffening of the fabric.

The nature of the color may vary widely; thus, for example, various soluble dyes which may or may not have affinity for the fiber itself or insoluble pigments may be used. Inorganic pigments may also be employed, and it is an advantage of the present invention that prints are no longer restricted to colors which can be attached to the fiber in a soluble form. This not only greatly widens the field of useful colors but likewise permits marked economies because many of the pigment colors otherwise difficult to use, such as ultramarine, the phthalocyanine pigments, lake colors such as phosphotungstic and phosphomolybdic lakes of basic dyestuffs, can now be successfully directly applied.

Colors may also be incorporated which are formed by causing a colored component to react with a resin to yield colored resin complexes. The use of these complexes in the present invention permits the production of extremely uniform colors because the resin film itself is colored.

The fact that the coloring matter may be employed in the form of an insoluble pigment also permits the use of very large numbers of mixtures since it is not necessary in every case to use compatible colors. Thus, for example, by the printing process of the prior art, it would not be possible to use mixtures of colors which are capable of being developed with pigments which cannot be developed. By the process of the present invention, any mixture can be employed so long as one color does not react chemically with the other in aqueous dispersion to produce undesirable effects.

It is an advantage of the present invention that the resin which is present in the aqueous dispersion in many cases acts as a protection for the color. This is notably the case with colors which tend to be fugitive. In many cases, colors which are extremely fugitive, when printed by the present invention show an amazing fastness to light. The degree to which the durability of the colors is enhanced by the present invention will vary with different resins and different colors, but it is an advantage that in practically all cases the properties of the color are improved even though the degree of improvement is not the same with all.

Since the present invention does not depend on any apparent chemical reaction with the material coated or physical or chemical affinity of the color therefor, it is usable with success on a wide variety of materials. Thus, for example, fabrics of cotton, rayon, pigmented rayon, cellulose acetate, saponified acetate, silk, wool, synthetic polyamides, styrenes, proteins, isobutylene, and various mixtures may be employed. The invention is also useful for printing or coloring materials such as rubber base automobile upholstery cloth and the like. The invention may be used also in coloring paper which may be sized or unsized, or which may be given coatings of various materials.

An added advantage of the present invention is that the prints made thereby are resistant to stiffening processes such as the use of solutions of cellulose acetate which are being employed to a large extent for stiffening of fabrics either locally or throughout, for example, the stiffening of shirt collars, cuffs, etc. The invention is also applicable to materials which have been crease-proofed by any of the standard processes now employed. Due to the fact that it is not necessary for the color to have a particular affinity for the fiber, it is also possible to employ the present invention for the coloring of glass threads or ribbons or spun glass fabrics. The substantial absence of bridging from fiber to fiber which is so serious a drawback with lacquer printing and which probably accounts for the stiffening of a fabric which has been lacquer printed also permits the embodiment of the present invention on webbed elastic material since the prints do not crack when the material is stretched.

The emphasis has been placed above on the use of the present invention for printing because it is in this field that the economic advantages of the present invention are particularly striking because here the saving in color, and the use of colors which cannot be used effectively by the ordinary printing processes are especially marked. However, the invention is not in any sense limited to a printing process. On the contrary, it may be used for dyeing or for coloring materials by coating the whole surface with a single color. The process of the present invention is also useful for procedures in which a plurality of operations are involved. Thus, for example, a material can be colored a single color by the present invention using dyeing procedures and then patterns can be printed thereon. It is, of course, possible to use the present invention for printing designs on fabrics or other materials which have been dyed or colored by other processes.

The combined process may be effected in a plurality of consecutive steps or simultaneous printing of the present invention and other printing processes may be used. Thus, for example, one part of the design may be printed by the emulsions of the present invention and another part by printing with vat dyes, solubilized vat dyes, stabilized diazo compounds on naphthol prepared cloth and the like. It is an advantage of the present invention that the procedures which are used to set the portion of the design printed by known means do not affect the portion printed by the present invention. The resistance to the subsequent steps is particularly notable when the over-all print is subjected to a brief preliminary heat treatment to produce partial setting of the emulsion. When the printing involves solubilized vat dyes or stabilized diazo components, the subsequent acid ageing will usually effect the necessary preliminary setting to assure maximum sharpness and durability of the emulsion print.

The fact that the process of the present invention is substantially independent of the nature of the surface to which the color is to be applied makes its field of usefulness very wide and puts an important flexible tool at the command of the dyer and printer as well as other technologists having problems involving the coating of various materials.

Although the present invention may be used without additional ingredients, it is sometimes desirable to incorporate textile assistants such as wetting agents, penetrating agents, and the like which modify the material surface and color. The present invention is usable with the standard textile assistants which have been developed in large number in the past decade. For example, if a plasticizer such as dibutyl phthalate is incorporated in the emulsion, the pliability of the finished print is greatly improved. This improved pliability, of course, further increases the resistance of the printed fabric to crocking.

The present invention is not limited to any particular method of blending the cellulose ether with the resin used and it should be understood that direct blending, blending with heat, blending by means of a miscible solvent such as pine oil, and the like, are all included within the scope of this invention.

The invention will be described in detail in conjunction with a number of specific examples illustrating its applicability. The parts are by weight.

*Example 1*

25 parts of ethyl cellulose are added to 475 parts of a water-insoluble urea resin made by reacting dimethylol urea with cyclohexanol and the mixture is warmed and stirred at 80° C. until the ethyl cellulose is completely dissolved or a homogeneous mixture obtained. This homogeneous mass is then mixed with 500 parts of an oil modified alkyd resin and the entire resin mixture stirred while being heated to 80°–90° C. until a uniform resinous base is obtained. Then 2000 parts of an ammoniacal casein solution is slowly added thereto, stirring violently to form a stable emulsion. This emulsion is then further homogenized by passing it through a colloid mill. After ageing for 24 hours, the emulsion is reworked in the colloid mill and then pigmented by grinding a pigment mixture composed of 36.5 parts of Vat Brown RRD (pr. 103) and 3.0 parts of an oxidized Nigrosine (C. I. 364) therein by means of a Buhrstone paint mill.

The brown colored emulsions thus obtained, when printed with a standard textile printing machine and the prints set by heating for 5 minutes at 150° C. in an air oven, are found to produce colored patterns on fabrics which are of excellent fastness to both wet and dry crocking (Standard test on Crockmeter approved by American Association of Textile Colorists and Chemists). The prints are also fast to the official Launderometer wash test #3 of that association. The patterns obtained are remarkably sharp and the flexibility of final prints is good.

The casein solution used to emulsify the resinous base is prepared as follows: 1000 parts of powdered casein are added to 11,160 parts of water and stirred until a uniform suspension is obtained. Then 200 parts of triethanolamine and 600 parts of aqueous NH4OH (28%) are added and the entire mixture stirred until a clear homogeneous solution is obtained, whence 400 parts of sulfated lauryl alcohol are thoroughly incorporated.

*Example 2*

Two resinous bases are prepared, namely, base A and base B. To prepare base A, 20 parts of ethyl cellulose are added to 380 parts of a water-insoluble urea resin made by reacting dimethylol urea with cyclohexanol and the mixture stirred at 80° C. until a uniform mass is obtained. Then 400 parts of an oil modified alkyd resin are added at such a temperature (ca 80° C.) as to be fluid and the entire mass stirred until uniform.

Base B is made by taking 80 parts of dibutyl phthalate, 400 parts of a water-insoluble urea resin made by reacting dimethylol urea with cyclohexanol, and stirring together until uniform. This mixture is warmed to 80° C., then added to 400 parts of the same oil modified alkyd resin used in the previous mixture.

In preparing the clear emulsion, either of two methods can be employed. For example, base A can be emulsified by the procedure described in Example 1, that is, by using 1600 parts of the alkaline casein solution prepared as described and proceeding accordingly. Base B can be similarly emulsified using 1520 parts of the alkaline casein solution. The two emulsions can then be mixed and homogenized by passing them through a colloid mill.

As an alternative method, bases A and B, while warm, can be mixed directly and then emulsified using 3120 parts of alkaline casein solution.

The emulsions prepared by either of the two methods described are then uniformly pigmented with 96 parts of Vat Brown RRD (pr. 103), obtained by low temperature air drying of the presscake of this color, by successive passes through a Buhrstone paint mill.

The colored emulsions thus obtained produce clean, sharp patterns on cellulosic fabrics which, on being heat treated for 3 minutes at 150° C., are of excellent resistance to both wet and dry crocking and have good wash fastness.

*Example 3*

915 parts of ethyl cellulose are mixed with 2466 parts of pine oil and 458 parts of dibutyl phthalate and after the mixture has been heated to 80° C. it is stirred until uniform. At this point, 4580 parts of a compatible modified alkyd resin of the air or heat converting type are added thereto and the entire base stirred until homogeneous. This base is then homogenized by one passage over a regular three-roller ink mill and then pigmented by the addition of 1079 parts of a green pigment prepared by the coprecipitation from sulfuric acid solution of copper phthalocyanine and Vat Yellow (C. I. 1095) in the presence of blanc fixe. The pigment is ground into the resinous base by several passes over the ink mill until a uniform pigmentation is obtained. 2290 parts of a water-insoluble urea resin prepared by treating dimethylol urea with butanol and 2290 parts of a water-insoluble urea resin prepared by reacting dimethylol urea with octanol and then added and uniformly mixed on the ink rolls with the colored resinous mass. This green mixture is now emulsified in the manner described in Example 1 using 14,100 parts of alkaline casein solution.

The emulsion obtained produces clean, sharp, colored prints either when printed alone or in multicolored patterns with similar emulsions or in combination with stabilized azo colors of the Rapidogen (General Dyestuffs Corporation) or Calconyl (The Calco Chemical Company, Inc.) types. These prints, when properly cured or set, are found to have excellent resistance to wet and dry crocking and to have good wash fastness.

*Example 4*

334 parts of benzyl cellulose are mixed with 450 parts of pine oil, 450 parts of xylene, and 126 parts of a modified phenol-formaldehyde resin (Beckacite 1101, Reichhold Chemicals, Inc.), and the entire mixture warmed to 80° C. and stirred until uniform. Then 1544 parts of an air or heat converting alkyd resin are added thereto, the entire mixture stirred at 80° C. until homogeneous. The resinous base is now homogenized by one passage over a standard three-roller ink mill. 620 parts of a presscake containing 100 parts of Indanthrene Blue RS (C. I. 1109) are now incorporated on the same ink mill. The water contained in the presscake readily flushes off the rolls and after several passes over the mill, a very high degree of dispersion is obtained. To this blue resinous base are added 840 parts of a water-insoluble urea resin prepared by reacting dimethylol urea with butanol and 840 parts of a water-insoluble urea resin prepared by reacting dimethylol urea with octanol. These resins are thoroughly incorporated by a further pass over the ink mill, then the homogenized base emulsified in a manner similar to that described in Example 1 except that 515 parts of an 8% solution of ammonium linoleate is used as the emulsifying agent. Sharp, clean prints are obtained when the colored emulsion is used to print patterns on textile fabrics such as cotton or rayon.

Reference has been made in the present specification to the production of colored resins by reaction of the dye with the resin or using dye components in forming resins. It should be understood that I do not claim this feature per se in the present invention, but only in conjunction with the use of aqueous dispersions of water-insoluble resins having a cellulose ether incorporated therein which forms the essential subject matter of the present invention.

Reference has also been made to the increased light fastness imparted to many fugitive colors. I do not claim this increase in light fastness broadly in the present application but only in conjunction with the use of resin dispersions of the present invention.

In the examples, certain plasticizers have been described and pine oil has been referred to as a blending solvent. The plasticizers mentioned and pine oil are preferred because of their cheapness and effectiveness, but the invention is not limited thereto. On the contrary, other well known plasticizers for the resins used may be employed and pine oil may be replaced in whole or in part by other blending solvents, such as for example, xylene, nitroparaffins, and the like.

What I claim is:

1. A coloring composition for coloring fibers and fabrics comprising a colored aqueous dispersion of the oil-in-water type of a solution in an organic solvent of an alkyd resin, and a urea formaldehyde resin, both being water insoluble and capable of curing by heat and a substantially water insoluble cellulose ether, the composition being capable of printing by intaglio methods on the surface of fibers and fabrics to produce a sharp print with good wash fastness without resulting in relatively stiffened material.

2. A coloring composition for coloring fibers and fabrics comprising a colored aqueous dispersion of the oil-in-water type of a solution in an organic solvent of an alkyd resin and a urea formaldehyde resin, both being water insoluble and capable of curing by heat and a substantially water insoluble cellulose ether, the coloring matter being a finely divided water insoluble pigment, the composition being capable of printing by intaglio methods on the surface of fibers and fabrics to produce a sharp print with good wash fastness without resulting in relatively stiffened material.

3. A coloring composition for coloring fibers and fabrics comprising a colored aqueous dispersion of the oil-in-water type of a solution in an organic solvent of an alkyd resin and a urea formaldehyde resin, both being water insoluble and capable of curing by heat and a substantially water insoluble cellulose ether, the coloring matter being a finely divided organic pigment, the composition being capable of printing by intaglio methods on the surface of fibers and fabrics to produce a sharp print with good wash fastness without resulting in relatively stiffened material.

4. A coloring composition for coloring fibers and fabrics comprising a colored aqueous dispersion of the oil-in-water type of a solution in an organic solvent of an oil-modified alkyd resin and a urea formaldehyde resin, both being water insoluble and capable of curing by heat and a substantially water insoluble cellulose ether, the composition being capable of printing by intaglio methods on the surface of fibers and fabrics to produce a sharp print with good wash fastness without resulting in relatively stiffened material.

ALFRED L. PEIKER.